Dec. 13, 1960
L. A. M. PHELAN
2,964,219
CYLINDRICAL FREEZER COVER
Original Filed Sept. 18, 1956
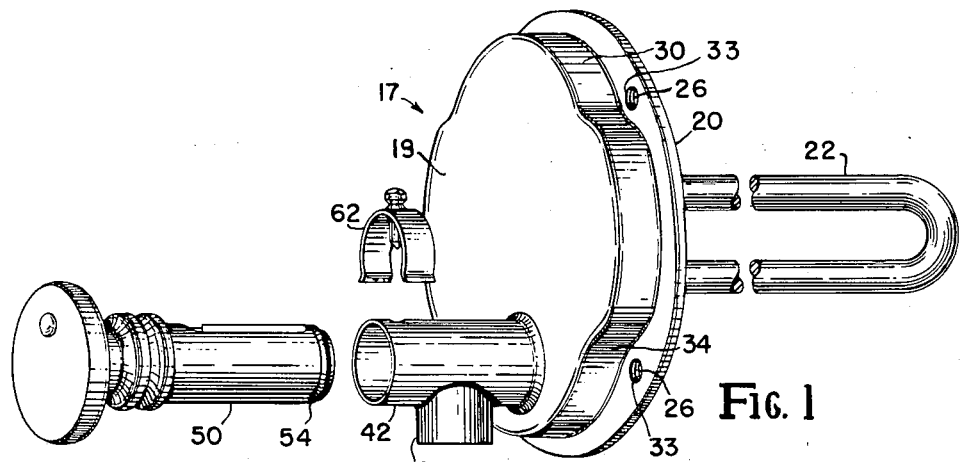
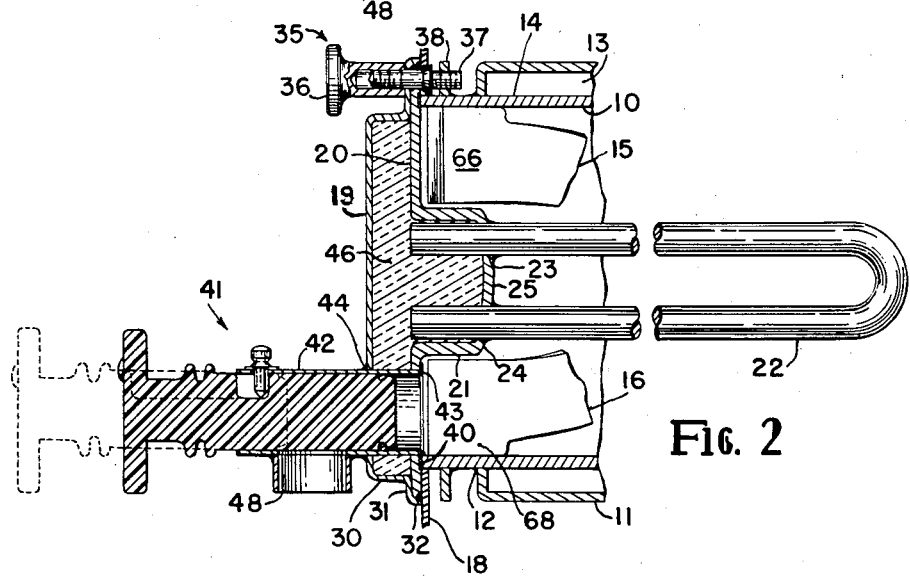
INVENTOR
LOUIS A. M. PHELAN
BY: James E. Nilles
ATTORNEY

2,964,219
CYLINDRICAL FREEZER COVER

Louis A. M. Phelan, Beacon Hill, Roscoe, Ill.

Original application Sept. 18, 1956, Ser. No. 610,590, now Patent No. 2,916,044, dated Dec. 8, 1959. Divided and this application Aug. 28, 1957, Ser. No. 681,874

1 Claim. (Cl. 222—380)

This invention relates generally to freezers for ice cream, custard and the like of the type in which the frozen product is usually drawn off into an edible cup for immediate consumption. Freezers of this general type usually comprise a horizontally disposed refrigerated cylinder and the fresh mix is introduced adjacent one end thereof in a substantially liquid state and drawn off through the other end of the cylinder as a frozen edible product. The invention relates more particularly to a removable cover for the "serving" or front end of such a refrigerated cylinder, which cover has a central hub member extending into the freezer cylinder that cooperates with the paddle ends of a feed screw to efficiently force the frozen product out of the serving valve.

Accordingly, the invention provides a front cover for a freezer having a driven rotor, said cover having a large central hub extending into the cylinder which causes the rotor to be very effective in forcibly discharging the product through a serving valve. This removable cover is of such construction so as to define a path of movement for the material that is moved by the ends of the rotor and is highly efficient in performing its intended functions, and easily and thoroughly disassembled and cleaned.

Other objects and advantages will appear hereinafter, reference being had to the attached sheet of drawings in which, by way of preferred example only, is illustrated the invention.

In the drawings:

Figure 1 is a perspective exploded view of a cover made in accordance with this invention, and Figure 2 is an elevational, cross-sectional view of the cover shown in Figure 1 but assembled and secured to a freezer cylinder.

Referring more particularly to Figure 2 of the drawings, a horizontally disposed freezer cylinder 10 has a jacket 11 welded thereto at 12 to form an annular chamber 13 through which refrigerant is passed in the well known manner. An ice cream or the like mix is introduced adjacent the rear end (not shown) of the cylinder and fed forwardly towards the front end 14 while being thoroughly beaten and aerated by the rotatable helical screws 15, 16 of the driven rotor. For a more complete description of the rotor and its function, if deemed necessary, reference may be had to my co-pending U.S. application, Serial Number 604,481, filed August 16, 1956, entitled "Freezer Mechanism," now Patent Number 2,810,557, issued October 22, 1957. It is believed sufficient to say that the rotor is driven from the rear end of the freezer and has no central front supporting shaft.

A cover 17 is provided for the front end of cylinder 10, and when the entire unit is assembled within the cabinet 18, only the outer wall 19 of the cover is exposed to view. The cover also includes a disc shaped mounting plate 20 having a large hub portion 21 pressed therein. The hub extends from the center of the plate 20 and into the cylinder between the helical screws 15, 16. A retarder 22 extends through apertures 23, 24 in the end 25 of the hub and the ends of the retarder are securely welded thereto in sealing relationship. For a more complete description of this retarder and its function, reference may be had if desired to the above mentioned patent. It is believed sufficient to say that this retarder acts to create the desired turbulence within the cylinder. A plurality of circumferentially spaced apertures 26 extend through the plate 20 adjacent its outer edge. The outer wall 19 has a generally axially extending peripheral flange 30, which extends axially toward plate 20, a radial flange 31, and a lip portion 32 extending over the edge of plate 20. The lip 32 is welded to plate 20 all around its circumference to form an air-tight seal. Radial flange 31 also has a plurality of circumferentially spaced apertures 33 which register with apertures 26. The edges of the mating apertures 26, 33 are welded together to form an air-tight seal. The outer wall is pressed into shape from a sheet of steel, preferably stainless steel, and has a series of recesses 34 in alignment with its apertures to admit the fastening means 35. The fastening means are provided to facilitate easy and quick removal of the cover assembly from the freezer cylinder for cleaning and inspection purposes. Large nut members 36 are threadably engaged in the bolts 37 which extend through the apertures in the cover and are in turn threadably engaged in the ring 38 welded to the cylinder. The cover assembly can be readily removed from the cabinet and cylinder when the four large nuts 36 are unscrewed. A non-metallic ring 40 is set into the inner wall of plate 20 and acts as a seat for the front edge of the cylinder to form a leakproof seal therebetween.

A serving valve 41 is provided for the cover and extends outwardly from the lower side thereof. The valve includes a generally horizontally positioned discharge tube 42 which passes through the plate 20 and the outer wall 19, and is welded thereto at 43 and 44 respectively. An insulating material 46 may be inserted within the space between plate 20 and outer wall 19.

The discharge tube has an outlet 48 extending downwardly from its lower side and is of sufficient diameter to permit free flow of the product when the valve is open. An elongated piston 50 is provided which has a diameter only slightly less than the bore of tube 42 so as to form a snug sliding fit therewith. As shown by the full lines of Figure 2, the inner end of the piston is located within the cover 17 when the valve is in the closed position. A sealing means in the form of a flexible O-ring 54 is seated in the piston adjacent its inner end. Thus the O-ring forms a sliding seal with the uniform bore of the tube regardless of axial displacement of the piston, for example, when the piston is in the full line position shown in Figure 2 (locked position) or when it is pushed still farther into the tube when the operator has just closed the valve. When the piston is withdrawn outwardly to the position shown in dotted lines in Figure 2, the product is free to flow through the outlet 48.

When the piston is in the position shown by the dotted lines of Figure 2, the product is forced out of the cylinder by the revolving paddles 66, 68 of the screws. In this connection the large hub 21 serves an important function in that it reduces the cross-sectional area of the front end of the cylinder and makes the paddles more effective in forcing the product out of the serving valve with the required pressure. In other words, it defines a path of movement for the product being moved by the paddles and prevents the product from simply being "pushed aside" by the paddles.

The paddle ends 66, 68 of the rotating helical screws 15, 16 are of a width substantially equal to the space between the hub and the cylinder and force the material therebetween to move in front of the paddles as they rotate, to thereby force the material out of the discharge tube 42 as it is moved past the tube. As previously mentioned, the rotor has no front central supporting shaft but, instead, the outer edges of the paddles bear in sliding relationship with the inner surface of the cylinder so as to form a bearing for the front end of the cylinder.

This application is a division of the co-pending application, Serial Number 610,590, filed September 18, 1956, now Patent Number 2,916,044, dated December 8, 1959, and entitled, "Cover and Serving Valve for Freezers."

Various modes of carrying out the invention are contemplated as being within the scope of the following claim particularly pointing out and distinctly claiming the subject matter which is regarded as the invention.

I claim:

In combination, a horizontal freezer cylinder having a discharge end, a cover removably secured to said end and having an outlet adjacent the bottom thereof, a valve member slidable in said outlet, a rotor rotatably mounted in said cylinder and having a plurality of helical screws for moving material axially in said cylinder and toward said cover, said screws each having a paddle at its end adjacent to said cover and bearing against the inner wall of said cylinder and constituting the sole support of the end of said rotor therein, and a central hub attached to and extending from said cover and into said cylinder and between the said ends of said screws to thereby define an annular path through which said screw ends pass, said screw ends also being of a length to terminate closely adjacent said cover and of a width substantially equal to the space between said hub and said cylinder, whereby as said rotor rotates said screw ends positively push material in said path toward said outlet.

References Cited in the file of this patent

UNITED STATES PATENTS

| | | |
|---|---|---|
| 1,289,613 | Bell | Dec. 13, 1918 |
| 1,908,117 | Clapp et al. | May 9, 1933 |
| 2,306,602 | Harrington | Dec. 29, 1942 |
| 2,746,730 | Swenson et al. | Mar. 22, 1956 |
| 2,758,823 | Vasby | Aug. 14, 1956 |
| 2,810,557 | Phelan | Oct. 22, 1957 |